United States Patent [19]

Biss

[11] Patent Number: 5,756,977
[45] Date of Patent: May 26, 1998

[54] CASH REGISTERS

[75] Inventor: Edgar L. Biss, Llandogo, United Kingdom

[73] Assignees: Tellermate Cashroom Systems Limited; Cash Bases GB Limited, both of United Kingdom

[21] Appl. No.: 592,485

[22] Filed: Jan. 26, 1996

[30] Foreign Application Priority Data

Jan. 26, 1995 [GB] United Kingdom ............... 9501535

[51] Int. Cl.⁶ .................................................. G07G 1/00
[52] U.S. Cl. ............................. 235/7 R; 235/22; 235/7 A
[58] Field of Search ............................ 235/7 R, 7 A, 235/6–28

[56] References Cited

U.S. PATENT DOCUMENTS

| | | |
|---|---|---|
| 4,447,885 | 5/1984 | Biss . |
| 4,512,428 | 4/1985 | Bullivant ............... 177/25 |
| 4,522,275 | 6/1985 | Anderson .............. 177/25 |
| 4,646,767 | 3/1987 | Hikita .................. 133/8 R |
| 4,674,060 | 6/1987 | Larkin et al. ........ 364/567 |
| 4,992,645 | 2/1991 | Kasahara et al. ...... 235/1 |
| 5,193,629 | 3/1993 | Lare . |

FOREIGN PATENT DOCUMENTS 2076979  12/1981  United Kingdom .

*Primary Examiner*—J. R. Scott
*Assistant Examiner*—Daniel Chapik
*Attorney, Agent, or Firm*—Cushman Darby & Cushman Intellectual Property Group of Pillsbury Madison & Sutro, LLP

[57] ABSTRACT

A money drawer of a cash register has a frame which supports a number of individual coin cups and note cups. A respective weighing device, supported on a base of the register, is provided for each cup. A positioning mechanism, for example, comprised of cam followers and cam surfaces is arranged to determine the position of the frame. The arrangement is such that on closing the money drawer, the frame is lowered to release each cup such that it is engaged with as associated weighing device whereby the weight of the cash or bills in each cup may be calculated. The weight signals may be used to determine the number of cash or bills in the cups and/or their value. A simple record of each determination may be kept so that if there are errors in the cash register at the end of a period the record can be scrutinized for irregularities. The information may also be provided to processing means for storage and/or processing.

13 Claims, 7 Drawing Sheets

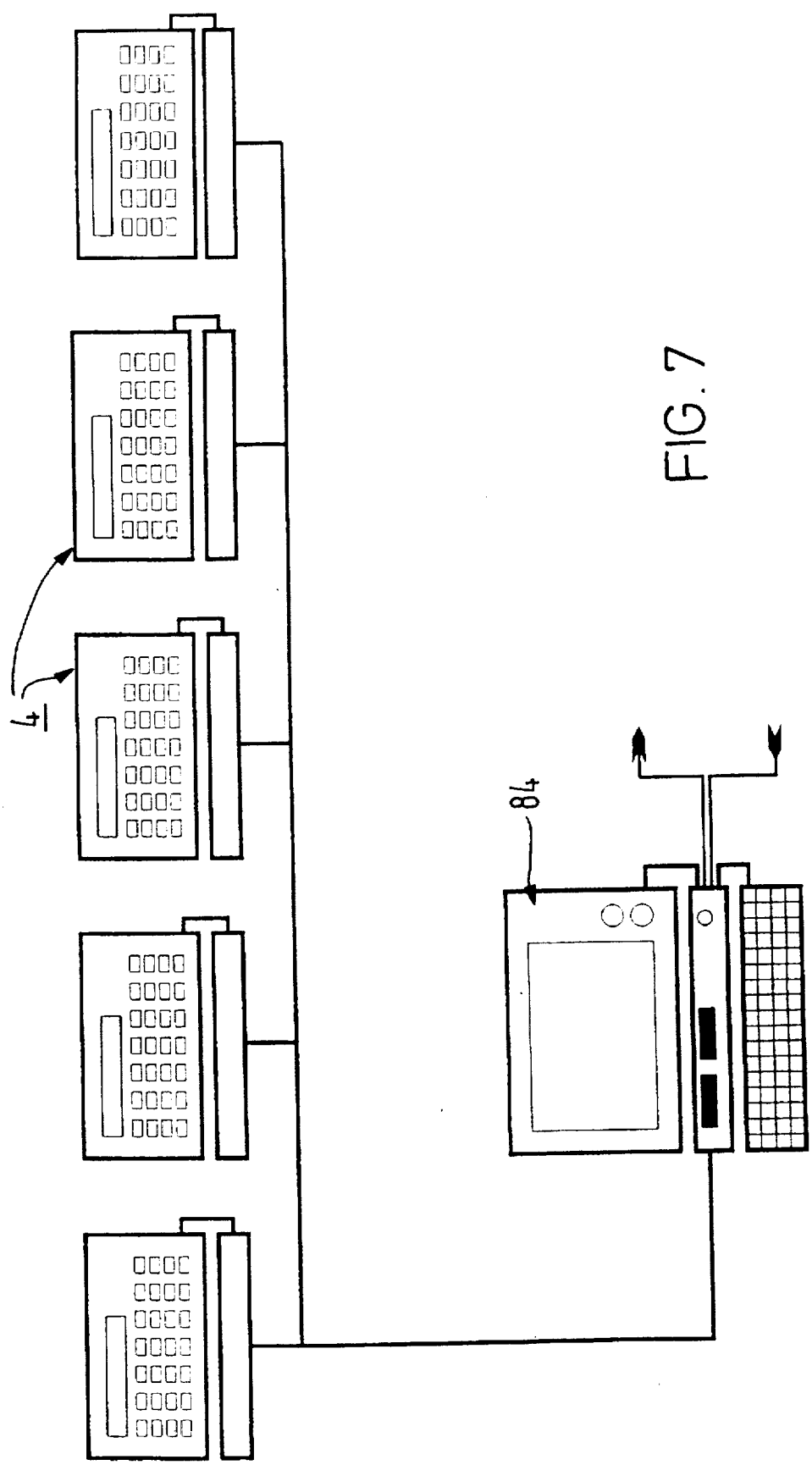

CASH REGISTERS

BACKGROUND TO THE INVENTION

The present invention relates to a cash register and to methods of using such cash registers, for example, for auditing the money therein.

Cash registers are commonly used in normal commerce and the money contained therein, in the form of cash or bills, will be coins of the realm and banknotes. However, it is also possible for cash registers to be used to contain and dispense cash and currency bills in the form of privately issued tokens, vouchers and certificates if required. The terms "cash/money", "coins/cash" and "notes/bills" are used herein to refer to all such tokens, vouchers and certificates and are not limited to legal tender only. Similarly, the term "cash register" is used to refer to any apparatus for facilitating the storage and dispensing of cash and bills.

Cash registers are used by retail outlets and other businesses to record transactions and to track the money concerned in those transactions. A cash register has a money drawer to contain the money and this is generally locked in its closed position. The money drawer is released by operation of the register for a transaction with a customer, for surplus money to be "skimmed" by security staff, or for the fund of money it contains to be supplemented. The only opportunity for removing money illicitly from the drawer is on these occasions. The register records each transaction and so the amount of money which should be contained within the register is generally known. However, in order to reconcile the actual contents of the register with the expected contents it is necessary to count the contents of the money drawer.

In supermarkets and large scale retail stores, checkout cashiers are changed frequently. However, because it is a very time consuming process, it is common practice to count the money at a checkout infrequently. Consequently, there is an opportunity for cashiers to steal money, typically by handing out excess change to accomplices, by accepting a lower amount than that due, or simply by pocketing the amount tendered, in the knowledge that the reconciliation cannot identify them as the culprits.

These identified problems are not easily dealt with as there is currently no method of counting the money in a money drawer except by interrupting the business at that cash register and counting the money.

SUMMARY OF THE INVENTION

It is an object of the present invention to provide a cash register in which the contents can be determined frequently and without human intervention.

According to a first aspect of the present invention there is provided a cash register having a money drawer, the cash register comprising a plurality of individual compartments within said drawer for receipt of money of different denominations, and weighing means arranged to take weight readings from the money compartments.

With an embodiment of a cash register of the invention, the money drawer is selectively maintainable in a closed or an open condition, and weight readings from all of the compartments are taken each time the money drawer is closed. These weight readings can be used, in well known manner, to provide a determination of the value of the contents of each compartment.

Additionally and/or alternatively, weight readings may be taken each time the weight of the money compartments changes, and/or periodically.

Preferably, a plurality of individual compartments are provided in the drawer, each for receipt of cash of a different denomination, wherein said weighing means comprise a respective weighing device associated with each said coin compartment, and wherein said weighing devices are arranged to provide an indication of the value of the cash of each denomination and/or of the value of all of the cash in the money drawer each time the money drawer is placed in its closed condition.

Additionally, a plurality of individual compartments within the drawer may be designated for receipt of bills of different denominations. If required, one or more weighing devices may be associated with the note compartments such that weight readings can be made on each drawer closure from which information as to the value of the contents of the note compartments can be determined.

In an embodiment, the cash register further comprises positioning means arranged to ensure that upon placing the money drawer in its closed condition, each compartment to be weighed is appropriately engaged with the respective weighing device.

Preferably, each weighing device has a respective weighing platform on which a, or a succession of, coin or note compartments are arranged to be supported upon placing of the money drawer in its closed condition.

Positioning means are provided to ensure that on closure of the money drawer each compartment to be weighed can be appropriately supported on the weighing platform of a selected weighing device. For example, a single weighing device may be provided to take weight readings from a number of compartments in succession. In that case, the positioning means include means for appropriately positioning the weighing device relative to each such compartment.

Whether movable weighing devices are provided, or each weighing device is associated with a respective single compartment, it is necessary, on closure of the money drawer, to ensure that each weighing device and the compartment it is to weigh are appropriately positioned so that the weight of the compartment acts on the weighing platform of the respective weighing device. In an embodiment, said positioning means utilises cams and cam followers, engaged simply by the mechanical engagement of the drawer in its closed condition, to engage the compartments onto respective weighing devices.

For example, the positioning means may comprise a mechanism for lifting weighing devices to receive the weight of respective compartments. Alternatively, said positioning means may comprise a mechanism for lowering or releasing the compartments individually upon drawer closure, or may comprise a supporting frame for supporting a number of the compartments, the frame being lowered upon drawer closure.

The positioning mechanism may be any suitable mechanism and may be mechanically or electrically controlled. In its simplest form, the mechanism is mechanical, for example, utilising cams and cam followers, and may be engaged simply by the mechanical engagement of the drawer in its closed condition.

The weight readings can be taken by the weighing devices in less than a second. However, means may be provided to prevent immediate reopening of the money drawer after its closure to ensure, for security reasons, that the necessary weight readings are taken upon closure of the drawer. Such means may comprise delay means to ensure that there is a predetermined delay after the closure of the money drawer before reopening is allowed. Alternatively, opening of the money drawer may be prevented until the necessary weight readings have been completed.

The cash register may be provided with processing and/or memory means to record the weight readings from each weighing device. Additionally and/or alternatively, the cash register may be coupled to an external processing and/or memory device.

Although it is possible to take weight readings from respective note compartments, there are difficulties in weighing banknotes which require more complex weighing procedures than is necessary for cash, for example. In this circumstance, therefore, it may be required simply to provide weigh cells for the coin compartments. This is not generally a problem because bills are "skimmed" from the register regularly. To track the value of bills within an individual cash register requires only that each time bills are "skimmed" therefrom, a fixed value of banknotes is retained in the cash register or the value of the banknotes remaining is recorded.

The cash register may comprise, or may be used in conjunction with, apparatus for warning if wrong change is provided. Preferably, said apparatus comprises processing means arranged to receive details of transaction amounts entered into the cash register, and information as to the value of the money contents of the money drawer derived from said weighing devices. The processing means is arranged to generate a warning if there is an inconsistency between the information received.

Additionally and/or alternatively, input means are provided to enable the input to said processing means of information related to the value of bills remaining within the cash register. The processing means is also arranged to receive information derived from weight readings as to the value of the cash within the cash register drawer.

According to a further aspect of the present invention there is provided a network of cash registers comprising a plurality of cash registers, each said cash register being as defined above, and a common computer coupled to receive information from and/or to supply information to each said cash register.

The present invention also extends to a method of auditing money in a cash register, where the cash register has a money drawer, and a plurality of individual compartments within said drawer for receipt of money of different denominations, said method comprising the steps of weighing said money compartments and determining from the weighings values for the contents of said compartments.

With an embodiment of a method of the invention, the money drawer is selectively maintainable in a closed or an open condition, and the contents of said compartments are determined after each closure of the money drawer. This enables the contents of the money drawer to be monitored. For example, details of the transaction being effected may be input to the cash register to effect opening of the money drawer, and this information together with information as to the values for the contents of the compartments may be fed to processing means for utilisation as required.

Preferably, upon each closure of the money drawer, at least all of the compartments for receiving cash are weighed so that the coin content of the money drawer is continually monitored.

In order to perform a full audit of the money in a cash register it is necessary to track not only the value of the coin contents but also the value of the note contents. This may be achieved either by weighing all the compartments, including those for containing bills, and determining the value of the contents from the weighing, or weighing the coin compartments only and periodically ascertaining the value of the bills within the money drawer by other means.

In a preferred embodiment, the compartments weighed are the plurality of individual compartments each for receipt of cash of a different denomination. One weighing device may be associated with each said coin compartment, or one or more movable weighing devices may be used to take weight readings in succession from the coin compartments.

The method also comprises the step of ensuring that on closure of the money drawer each compartment to be weighed is appropriately engaged with a weighing device, for example, is positioned on a weighing platform of the respective weighing device. For example, said selected compartments may be lowered or released onto the weighing platforms upon drawer closure, or the weighing devices may be raised.

The method may also comprise the step of preventing immediate reopening of the money drawer after its closure. This enables it to be ensured that the necessary weight readings are taken upon closure of the drawer. For example, reopening of the drawer may be prevented for a predetermined time after its closure. Alternatively, opening of the money drawer may be prevented until after weight readings have been completed.

In an embodiment, for warning if wrong change is provided, said method may further comprise the steps of providing details of a transaction amount when effecting an opening of the money drawer, together with the information as to the value of the money contents of the money drawer derived from weight readings taken upon the closure of the drawer, and generating a warning if there is any inconsistency.

BRIEF DESCRIPTION OF THE DRAWINGS

Embodiments of the present invention will hereinafter be described, by way of example, with reference to the accompanying drawings, in which:

FIG. 7 illustrates the connection of a number of individual cash registers to a common, external computer.

DESCRIPTION OF PREFERRED EMBODIMENTS

Cash registers are well known and may have various features. However, all cash registers generally have a money drawer in which money, in the form of cash and bills, is retained. Normally, the money drawer is retained and locked in its closed condition. To gain access to the contents of the drawer it is necessary to enter the details of a transaction into the cash register which will then open the drawer as part of that transaction. In modern cash registers details of the transaction, for example, its value, and often a description of the goods concerned, are recorded on a hard copy or in memory.

The present invention can be used in conjunction with any form of cash register. For example, it may be required to have a cash register in which the money drawer remains open all the time so that opening of the drawer is not part of the transaction. However, as the invention provides information as to the value of the contents of the money drawer the applications of the invention are increased if details of each transaction are input, and if the cash register has a data processing capability either provided within the cash register and/or by associated computing apparatus for use in conjunction therewith.

Figure 1:
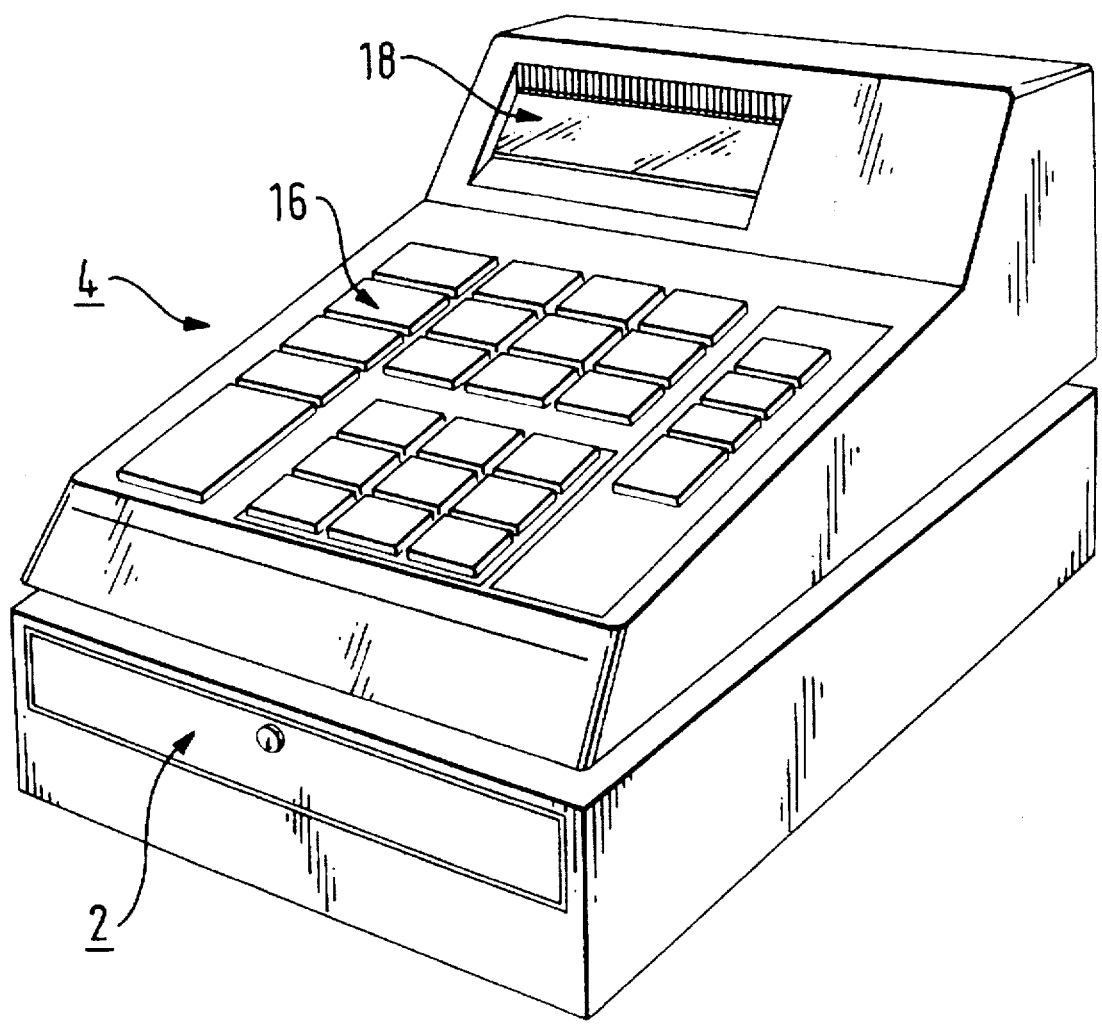
FIG. 1 shows schematically a perspective view of a cash register.
Figure 2:
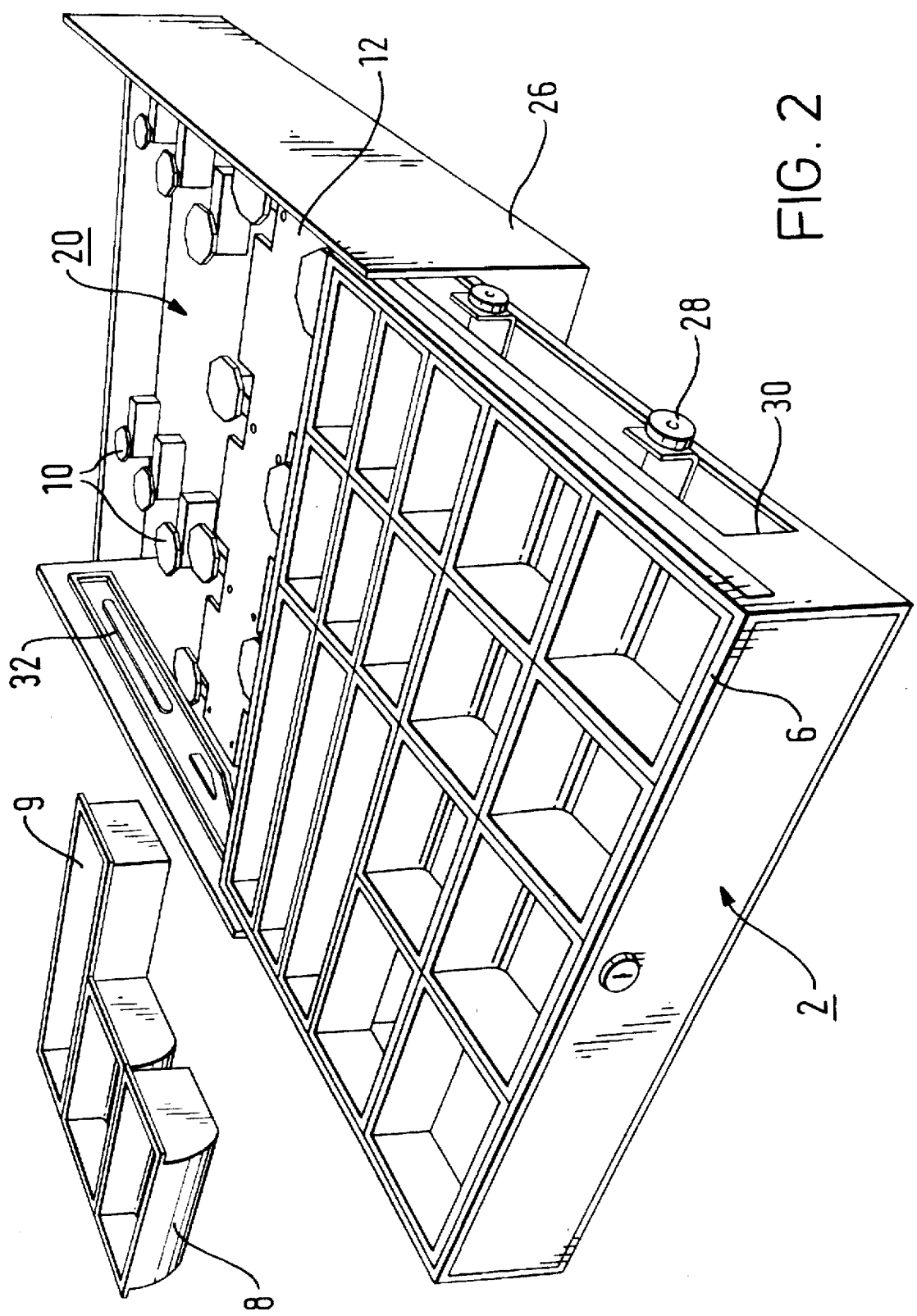
FIG. 2 shows schematically a perspective view of a money drawer of the cash register of FIG. 1 shown in its open condition.

The present invention is described and illustrated below by reference to a cash register 4 as shown in FIG. 1. This cash register 4 has a money drawer 2 which is slidable between its closed condition as shown in FIG. 1 and an extended open condition as shown in FIG. 2. However, it will be appreciated that not all cash registers have a slidable drawer. For example, cash registers are commonly provided with a money drawer which has a lid which may be selectively opened and closed with the drawer remaining stationary. Any construction of cash register may be provided. Currently, it is preferred that the construction be one which enables the money drawer to be maintained selectively in an open or a closed condition.

The cash register 4 shown in FIG. 1 has a user interface provided by a number of keys 16 which enable details of a transaction to be input. In known manner, pressing selected keys 16 to signify the completion of a transaction also effects the opening of the money drawer 2. A display 18 for visually displaying details of the transaction is also provided. If required, a till roll and printing means therefor (not shown) may be provided to enable a hard copy of the transaction details to be printed.

Figure 3:
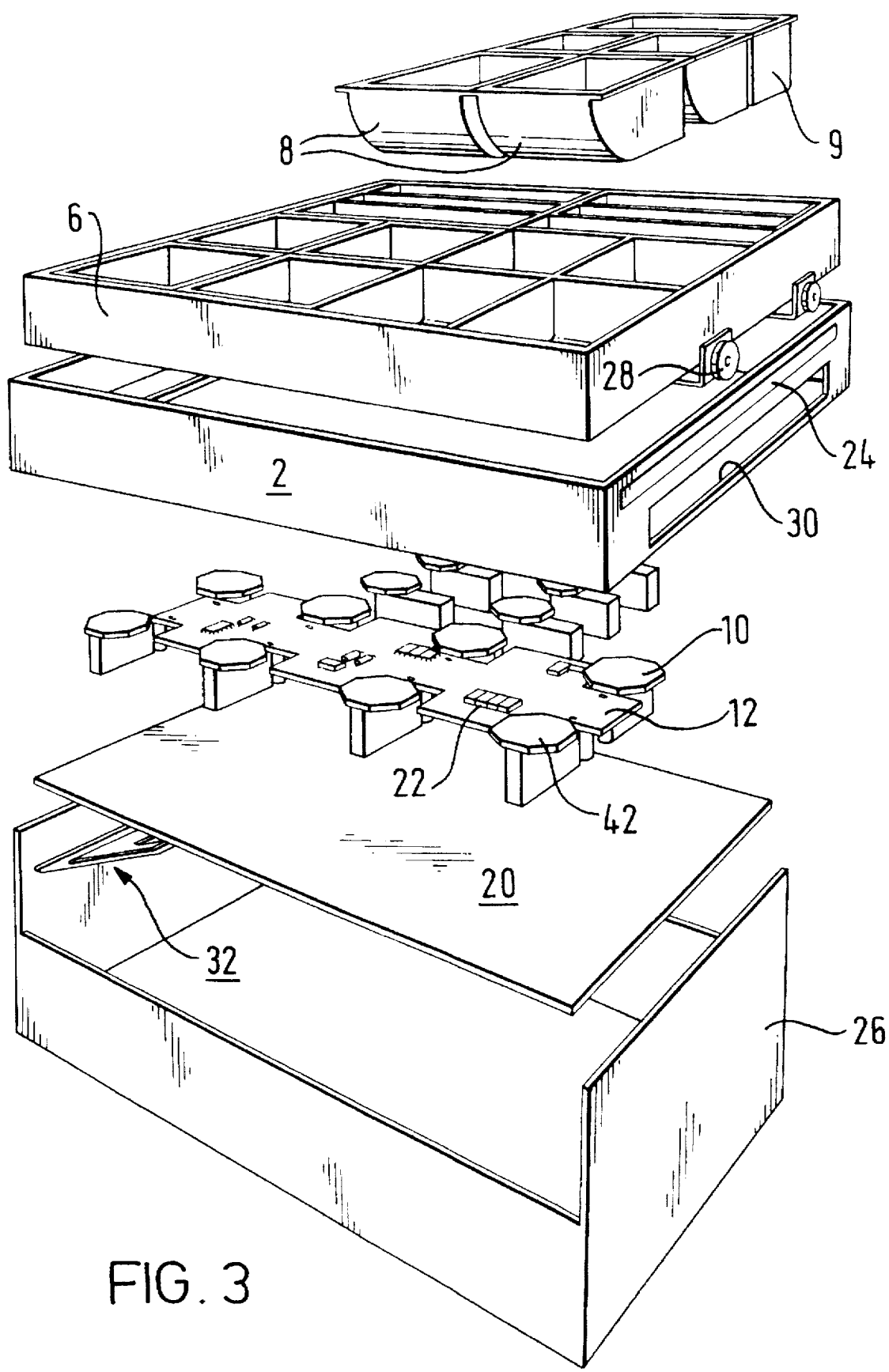
FIG. 3 shows an exploded perspective view of the money drawer of FIG. 2, FIGS. 4a and 4b show a side view and a perspective view from below of a coin cup for use in the money drawer of FIGS. 2 and 3.

As can be seen from FIGS. 2 and 3, the money drawer 2 has a frame 6 supported therein which, in its turn, supports a number of individual coin pockets or cups 8. In the embodiment shown, the coin cups 8 are all substantially the same in size, shape and weight. Similarly a plurality of individual note cups 9 is provided, and all of the note cups 9 have substantially the same size, shape and weight. However, the shape of the note cups 9, and consequently their size and weight, differs from those of the coin cups 8 as is indicated in FIGS. 2 and 3. It will be appreciated that each coin cup 8, for example, may be supported at any location of the frame 6 arranged to support the coin cups 8, and that when all of the coin cups are in position on the frame 6 a number of individual coin compartments will be defined thereby. In this respect, although the coin cups 8 themselves may be interchangeable, it is required that each compartment be designated and used for a specific denomination of coin. The note compartments similarly are each used for a different denomination of note.

Although in the illustrated embodiment the coin cups 8, for example, are all substantially the same in size, shape and weight, it may be preferred to make some cups larger than others or of a specific shape. This may be helpful where, for example, a particular denomination of coin is large in size and/or is required to be kept in large quantities. In this case, the coin cups 8 will differ in size and shape, making it necessary to allocate to each coin compartment the particular denomination of coin to be kept therein.

A respective weighing device 10, supported on a base plate 20 of the register 4, is provided for each coin compartment and for each note compartment. In the embodiment illustrated, the frame 6 supports two rows of coin cups 8, the cups in each row being spaced transversely across the front part of the money drawer 2. Two rows of weighing devices 10 are similarly spaced transversely across the front part of the base plate 20 so that each coin cup 8 may be engaged with a respective weighing device 10. The cups 9 in each of three rows of note cups 9 are also spaced transversely across the rear of the money drawer 2 and each is arranged to be selectively engaged with a corresponding weighing device 10. A transverse support 12 is also arranged to extend across the front part of the base plate 20. This support 12 carries electrical circuit elements, indicated at 22, forming the control electronics for the cash register.

In an alternative embodiment, where for example, differently shaped and sized coin cups 8 are provided, the cups 8 will not be equally spaced and neither will be the associated weighing devices 10. It will be appreciated that the weighing devices 10 are appropriately positioned relative to the cups they are to weigh.

Each of the weighing devices 10 may be constructed as required. For example, signals representative of weight may be obtained from a weighing device configured as a strain gauge, utilising piezoelectric cells, and/or utilising a vibrating wire. The only requirement for each weighing device is that it is able to discriminate a change which is less than a small fraction of the weight of an individual coin or note.

The money drawer 2 is, in the embodiment illustrated, arranged to be slid between a fully retracted closed position (FIGS. 1 and 3), and a fully extended open position (FIG. 2). In this respect, on each side of the money drawer 2 there is provided a slide or runner 24 arranged to cooperate with a respective side of a register housing 26 in which the money drawer 2 is received. The cash register 4 also includes a mechanism arranged to determine the position of the frame 6 and of the cups 8 and 9 supported thereby. In this respect, on each side, the frame 6 is provided with two spaced cam followers 28. When the frame 5 is positioned within the money drawer 2, the two cam followers 28 on each side of the frame project through a slot 30 provided in the respective side of the money drawer 2. On its inner surface, the respective side of the housing 26 is provided with a cam surface 32 which is arranged such that movement of the money drawer 2 to its inwardly retracted, closed position, lowers the frame 6.

The positioning mechanism provided is required to locate each cup 8, 9 on its respective weighing device 10 so that a weight signal can be obtained from each cup 8, 9. It is preferred that this be done in a controlled manner, to protect the weighing device from shock, and it is preferred that the cups 8, 9 be removed from their weighing devices after a short time, for example, to enable the zero of each weighing device to be checked and/or calibrated. However, such refinements are optional.

In order to provide a weight signal from each cup 8, 9, the frame 6 of the positioning mechanism is lowered with the cups 8, 9 above or on their respective weighing devices 10 to release the cups from the frame. Subsequently the frame 6 may be raised to engage the cups 8, 9, for example, by way of lips 33, and lift them off the weighing devices 10.

Clearly any positioning mechanism capable of appropriately engaging the cups 8, 9 with the weighing devices 10 may be employed. The provision of a frame, as 6, is a particularly effective way to achieve the required location of the cups but other, alternate, means may be employed. Where a frame, as 6, is provided, the means to lift and lower it relative to the money drawer may be chosen as required. For example, pistons actuated by motors may be directly engaged with the frame 6 and driven as required.

In the illustrated embodiment, the frame 6 is lowered to release the cups 8, 9 onto their respective weighing devices by the inward movement of the money drawer and the consequent path for the frame 6 defined by the cam followers 28 and the cam surface 32. When engaged on a weighing platform 42 of its respective weighing device 10, a weight signal can be obtained from the cup 8, 9. As the weight of each empty cup 8, 9 is known, the weight of the cash or the bills in each cup may be determined. In known manner, the weight signals may be used to determine the number of cash or bills in the cups 8 or 9 and/or their value.

Figure 4A:
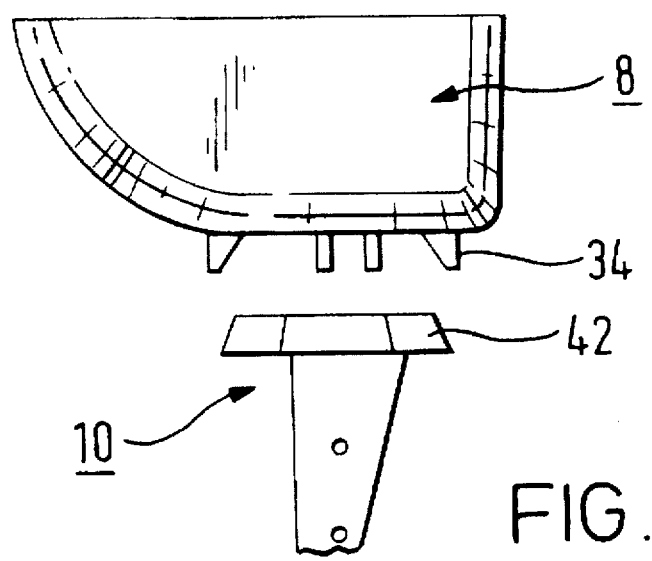
Figure 4B:
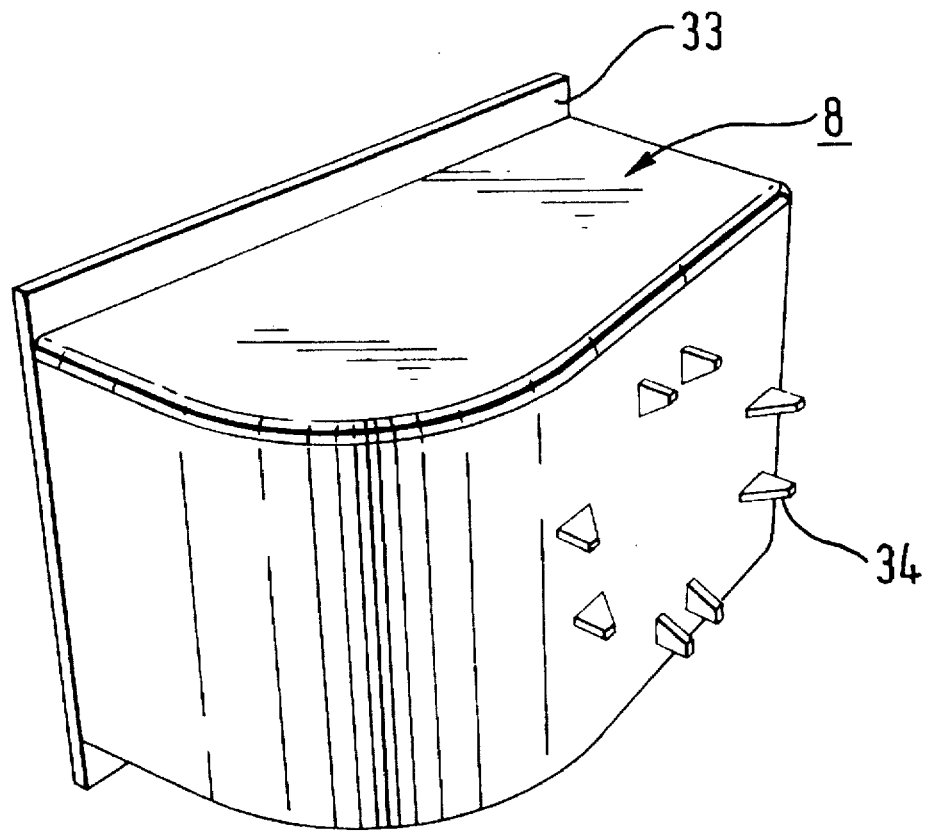

FIG. 4a shows a side view of a coin cup 8 arranged above a respective weighing device 10. FIG. 4b shows an underneath perspective view of the same coin cup 8. The lips 33 used to support the cup 8 relative to the frame 6 can be seen in FIG. 4b. On its underside, the cup 8 has a number of locating projections 34 which are provided to ensure that as the cup 8 is lowered onto the weighing device 10 it is accurately located with respect to the weighing platform 42. The projections 34 also act to minimise the area of contact between the coin cup 8 and the weighing device 10 to help prevent jamming. In this respect, it will be seen that the weighing platform 42 of the weighing device 10 is preferably hexagonal in cross section and has a generally conical shape, again to facilitate removal of the coin cup 8 when required. Each weighing device 10 is electrically connected to circuit elements 22 on the support plate 12 to provide the necessary weight signals.

As stated above, it is generally preferred that the cups 8, 9 be lifted from the weighing devices 10 after the weighing has been completed. This can be achieved in any manner. For example, the frame 6 may be lowered onto, and arranged to compress, a number of electrically actuatable, spring biased dampers (not shown). At the end of the weighing cycle, the dampers may be actuated such that they are extended under spring force and thereby raise the frame 6. As the frame 6 moves to its upper position, it engages and lifts the cups 8, 9.

It will be appreciated that upon each closure of the money drawer 2, the weighing devices 10 provide weight signals which contain information as to the value of the coin and note content of the money drawer at that time. Clearly, this information can be utilised in a number of ways. For example, a simple record of each determination may be kept so that if there are errors in the cash register at the end of a period the record can be scrutinised for irregularities. Additionally and/or alternatively, the information may be provided to processing or computer means for storage and/or processing. These processing means may be provided in, or associated with, the cash register.

The value of the coin and note content of the money drawer may be determined from the weighings made in any appropriate manner. For example, the methods for determining value from weight signals as described in British Patent No 2076979 may be utilised. Furthermore, use may be made of the difference in successive weighings to speed the weighings/calculations, and/or to ensure the accuracy of the determinations, and/or to provide the ability to take account of the presence of dirt or foreign bodies in the money drawer.

Commonly, a cash register, as 4, requires the input of details of a transaction in order to effect opening of the money drawer. Such information is entered by way of the keys 16. This information can be used, together with the money content of the drawer as determined on closure, to provide an indication as to whether a transaction has been carried out correctly. For example, before a transaction is undertaken, the value of the cash and bills in the money drawer 2 is known and may be stored by the processing means. If then a transaction is undertaken, the amount of the transaction is fed to the processing means as is the new coin and note content of the money drawer after its closure. In this way, the processing means is able to determine if the correct change has been given and/or if the correct amount of money has been lodged and to signal a warning if it has not.

The cash register 4 as illustrated is arranged to weigh both coin cups 8 and the cups or pockets 9 containing bank bills. However, bank notes vary in weight, and although procedures for counting them by weighing which are accurate have been developed, these require that additional weighing devices be provided. Thus, by weighing the bills in the money drawer, a full audit of the value of the money in the money drawer 2 may be obtained at each closure of the money drawer, but this may be at the cost of a higher cost for the system.

For some applications, therefore, it may be preferred that only the coin contents be determined upon each closure, or upon the majority of closures, of the money drawer. This still enables the processing means of the cash register to indicate whether a transaction has been carried out correctly. Thus, when a transaction is undertaken, the amount of the transaction is fed to the processing means together with the new coin content of the money drawer after its closure. At this time the processing means may be arranged to calculate all of the possible combinations of coin content which would be rational in terms of the transaction. A warning and record may be provided if an irrational content is determined. For example, if a transaction were for an integral multiple of the lowest denomination of banknote, the coin content of the money drawer for a legitimate transaction would either be unchanged or would have changed only to the value of the lowest denomination note. No other alteration of the coin content is rational. Similarly, if the transaction were for an amount such as £26.58, the value of the coin content should have changed by £4.42, £1.58, or these amounts plus the value of a banknote. Again, any other change would signify a possible wrong change situation, and a warning could be generated.

Obviously, it is useful to provide a frequent reconciliation between the transactional information recorded for the cash register and the actual money in its money drawer. One way of achieving this is to weigh both cash and bills on each closure of the drawer. Even if it is required to determine only the value of the cash by this method, full auditing can still be provided by use of an external means for counting the banknotes. Thus, it is necessary only to ensure that when periodically banknotes are "skimmed" from the money drawer, the few news which are retained either have a predetermined value or their value is recorded. The processing means is arranged to store the periodic determinations of the note value and to store the coin content value determined at each closure of the money drawer. When the money drawer is closed immediately after a predetermined value or a fixed value of bills has been left therein, the value of the bills and that determined for the coin content are read by the processing means. Furthermore, the "skimmed" banknotes which have been removed are counted, either manually or by a note counting device, and this information is input to the processing means so that a total value for the contents of the cash register at the time it is "skimmed" is obtained. Such an audit can be made at each "skimming" of the cash register.

Figure 5:
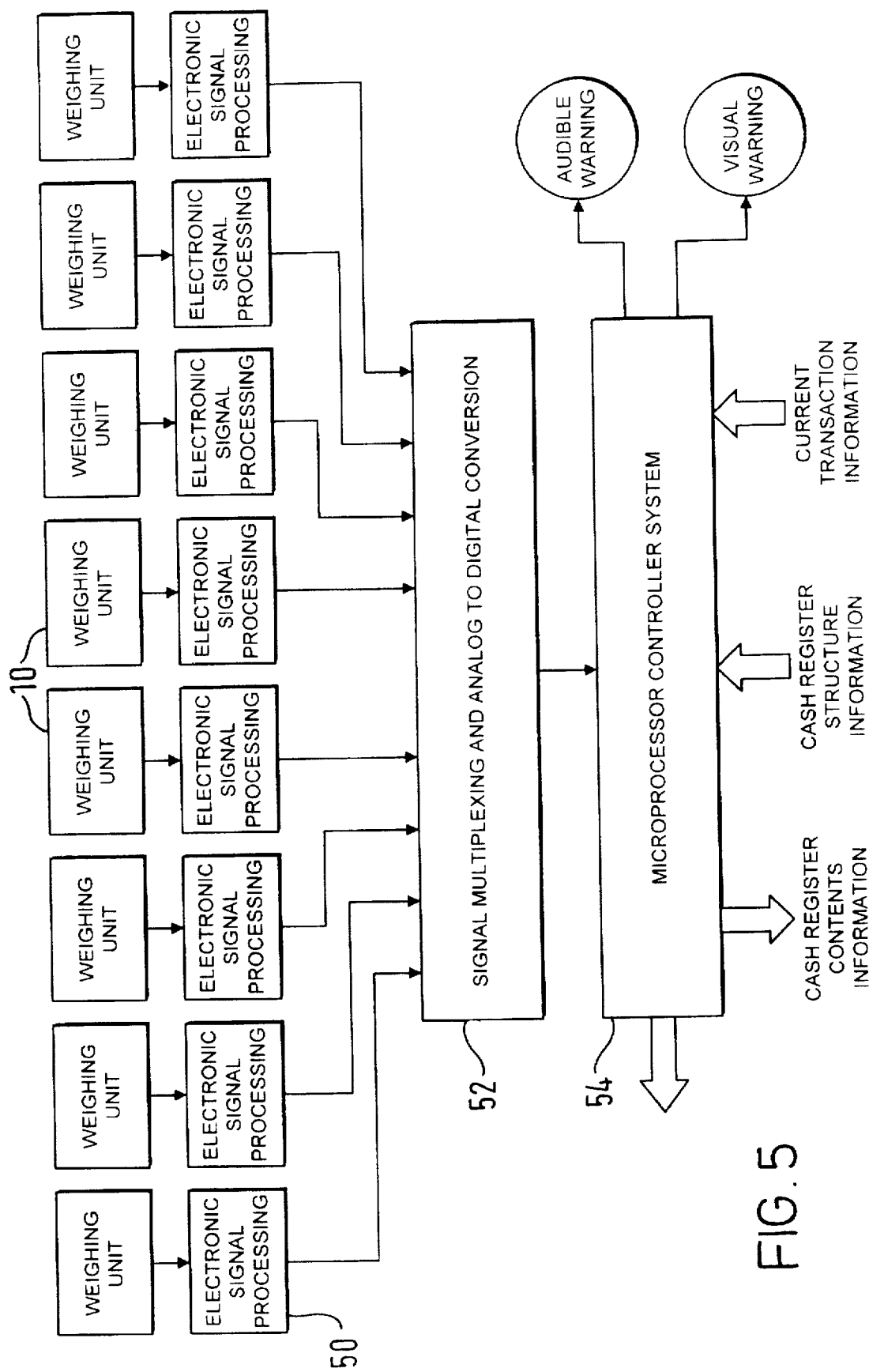
FIG. 5 shows schematically one example of a control system for a cash register.

FIG. 5 indicates schematically one implementation of the control system provided within the cash register 4. As shown, each weighing device 10 is arranged to feed its determined weight signal by way of a respective signal processing unit 50 to multiplexing means for the weight signals. The multiplexed signals are then applied to an analogue to digital converter 52. This enables the weight information determined from each weighing device 10 to be fed in its turn to a controller 54, preferably in the form of a microprocessor.

The tasks undertaken by the microprocessor 54 are shown, by way of example, in FIG. 5. Thus, when the money drawer 2 is shut, a closed signal may be generated as indicated at function 60. This signal may be generated, for example, by the application of weight to all of the weighing devices 10 or a drawer closed detector, such as a microscwitch (not shown), may be provided. At 62 the microprocessor 54 is shown as activating locking means for the drawer 2 so that it cannot be opened during a measurement cycle.

Where means such as the spring mechanism 44 and the platform 46 are associated with each cup 8, 9 it may be arranged, as indicated at 64, that only those cups which are to be weighed are moved into contact with the respective weighing device 10. In the flow chart of FIG. 7 only a single cup 8 or 9 is weighed at each time as indicated by function 66. The microprocessor 54 stores a record of the weight of the selected cup, and at 68, the microprocessor is arranged to subtract the cup weight from the weight signalled by the weighing device. The result, which represents the weight of the contents of that cup, is stored at 70. At function 72, the microprocessor determines if all of the cups which it is required to weigh at any one time have been weighed. If they have not the next cup to be weighed can be placed in position on its weighing device as indicated at 74, if this is required, and the weighing routine undertaken for that cup. When all of the cups it is required to weigh have been weighed, the microprocessor releases the locking mechanism on the drawer as indicated at 76.

Figure 6:
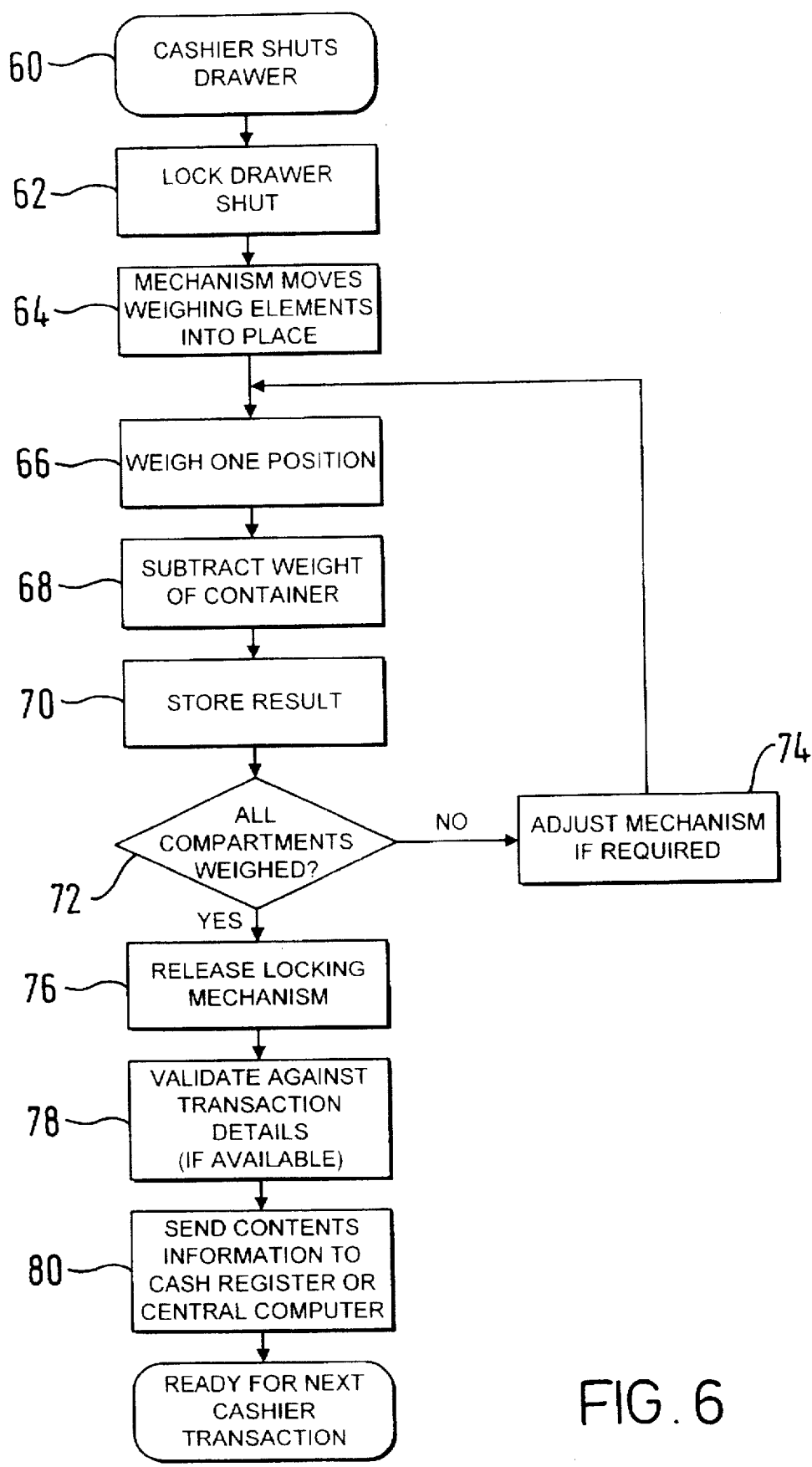
FIG. 6 is a flow diagram illustrating the main tasks associated with the control system of FIG. 5.

The microprocessor 54 is arranged to control the weighing operations and the storage of results therefrom. It is preferably also arranged to communicate with a processor provided in the cash register for establishing and totalling the transaction taking place. In this respect, and as shown in FIG. 5, the microprocessor 54 is arranged to receive from the cash register microprocessor information about the current transaction. This enables the controller 54 to determine from the transactional information and from the cash register contents information it has itself determined if the transaction was completed correctly and to indicate by issuing an audible and/or a visual warning where an error is made. This is indicated at function 78 in FIG. 6. At function 80, the microprocessor 54 forwards information about its contents either to the cash register processor and/or to a common, external computer 84.

The routines discussed above utilise the processing means 54 which may be provided in the cash register itself and/or associated therewith. If a plurality of cash registers 4 are provided, for example, as at a number of checkouts in a supermarket, a central computer 84 may be provided to which each cash register is networked, as indicated in FIG. 7. The processing and storage capabilities of the processing means and central computer may be distributed between the cash registers and the central computer in any appropriate manner.

In the simplest implementation, the central computer 84 would merely log the changes in the individual cash registers 4 and possible request additional change as is necessary. Such a system could be used for later manual reconciliation in the event of queries or suspected fraud. In a more sophisticated implementation, the central computer 84 might be told about each transaction as it occurs by the respective cash register 4 enabling immediate reconciliation to be made between the transaction details and the known contents of the cash register 4.

Other variations and modifications may be made to the embodiments of the invention as described and illustrated within the scope of the present application.

I claim:

1. A cash register having a housing, a money drawer carried by said housing, a closure mechanism movable between a first position in which the money drawer is closed and a second position in which the money drawer is open, and user interface means arranged, upon operation by a user, to move said closure mechanism to its second position to open the money, drawer, a number of individual coin compartments being formed in said money drawer for receipt of coins of different denominations, The cash register further comprising weighing means arranged to take weight readings of said individual coin compartments and to establish the number or value of the coins in each individual coin compartment, wherein said weighing means comprises a plurality of weighing devices, each weighing device being associated with, and arranged to weigh, a respective coin compartment, and positioning means for said coin compartments, said positioning means engaging each coin compartment with its associated weighing device when the money drawer is in its closed position, and said positioning means subsequently disengaging each coin compartment from its weighing device.

2. A cash register according to claim 1, wherein a plurality of individual bill compartments are additionally provided in said money drawer, each said bill compartment being arranged to contain currency bills of different denominations, and wherein said weighing means comprises a plurality of further weighing devices, each further weighing devices being associated with, and arranged to weigh, a respective bill compartment.

3. A cash register according to claim 1 or claim 2, wherein each said weighing device has a respective weighing platform on which the respective coin or bills compartment is arranged to be supported upon movement of the closure mechanism to its first position to close the cash drawer.

4. A cash register according to claim 1, wherein said closure mechanism comprises cooperating slide means on said cash drawer and said housing enabling movement of said money drawer relative to said housing between a first, fully retracted, closed position, and a second, extended open position.

5. A cash register according to claim 4, wherein said positioning means comprises a frame supported by said money drawer, each of said coin compartments being supported on said frame, and cam means engaging said frame and said housing and arranged such that movement of said cash drawer to its fully retracted, closed position, lowers said frame and releases the coin compartments.

6. A cash register according to claim 1, further comprising processing means arranged to receive and record the weight readings from said weighing means.

7. A cash register according to claim 6, wherein said processing means is arranged to receive details of transaction amounts entered into the cash register by way of said user interface means, and information as to the value of the cash content of the cash drawer derived from said weighing means at completion of a transaction, and said processing means is arranged to generate a warning signal if there is inconsistency between the transaction amounts and the information received.

8. A network of cash registers comprising a plurality of cash registers, each said cash register being in accordance with claim 1, and a common computer coupled to each said cash register to receive information from each cash register and to supply information to each said cash register.

9. A cash register according to claim 2, wherein said positioning means comprises a frame supported by said money drawer, each of said coin and said bill compartments is supported on said frame, and cam means engaging said frame and said housing and arranged such that movement of said cash drawer to its fully retracted, closed position, lowers said frame and releases the coin and bill compartments.

10. A method of auditing money in a cash register, where the cash register has a money drawer and a plurality of individual coin compartments within said money drawer for the receipt of coins of different denominations, said method comprising the steps of, when the drawer is in the closed position, engaging each individual coin compartment with a respective weighing device arranged to produce a weight reading, determining the number or value of the coins in each said coin compartment from the weight readings from the weighing devices, and then disengaging each individual coin compartment from its respective weighing device.

11. A cash register according to claim 9, further comprising processing means arranged to receive and record the weight readings from said weighing means.

12. A method according to claim 10, wherein a plurality of bill compartments are additionally provided within said money drawer, and wherein said money drawer is selectively maintainable in a closed or an open condition, and wherein upon each closure of the money drawer, all of the coin and bill compartments are weighed so that the content of the money drawer is continually monitored.

13. A method according to claim 12, further comprising the step of preventing immediate reopening of the money drawer after its closure to ensure that the necessary weight readings are taken before reopening of the drawer.

* * * * *